(12) United States Patent
Wang et al.

(10) Patent No.: US 11,176,128 B2
(45) Date of Patent: Nov. 16, 2021

(54) MULTIPLE ACCESS PATH SELECTION BY MACHINE LEARNING

(71) Applicant: International Business Machines Corporation, Armonk, NY (US)

(72) Inventors: Xiaobo Wang, Beijing (CN); Shuo Li, Beijing (CN); Ke Wei Wei, Beijing (CN); Heng Liu, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 432 days.

(21) Appl. No.: 15/980,112

(22) Filed: May 15, 2018

(65) Prior Publication Data

US 2019/0354621 A1    Nov. 21, 2019

(51) Int. Cl.
*G06F 16/2453* (2019.01)
*G06N 20/00* (2019.01)

(52) U.S. Cl.
CPC ......... *G06F 16/2453* (2019.01); *G06N 20/00* (2019.01)

(58) Field of Classification Search
CPC ............................. G06F 16/2453; G06N 20/00
See application file for complete search history.

(56) References Cited

U.S. PATENT DOCUMENTS

| | | | | |
|---|---|---|---|---|
| 7,310,638 B1* | 12/2007 | Blair | ................. | G06F 16/24568 |
| 2008/0195577 A1* | 8/2008 | Fan | ................... | G06F 16/24545 |
| 2012/0296936 A1* | 11/2012 | Nagatoshi | ........... | G06F 16/2453 |
| | | | | 707/770 |
| 2013/0138630 A1 | 5/2013 | Ying | | |
| 2013/0166480 A1* | 6/2013 | Popescu | ................. | G06N 20/00 |
| | | | | 706/12 |
| 2015/0310066 A1 | 10/2015 | Beavin | | |
| 2015/0379077 A1* | 12/2015 | Grosse | .............. | G06F 16/24542 |
| | | | | 707/718 |
| 2017/0017686 A1 | 1/2017 | Hao | | |
| 2017/0017689 A1* | 1/2017 | Scheibli | .............. | G06F 12/0802 |
| 2017/0249360 A1 | 8/2017 | Jason | | |
| 2017/0262502 A1* | 9/2017 | Rastunkov | ............. | G06N 20/00 |

* cited by examiner

*Primary Examiner* — Amresh Singh
*Assistant Examiner* — Fernando M Mari Valcarcel
(74) *Attorney, Agent, or Firm* — Stephanie Carusillo; George S. Blasiak; Heslin Rothenberg Farley & Mesiti PC

(57) ABSTRACT

Methods, computer program products, and systems are presented. The method computer program products, and systems can include, for instance: receiving, by a production database, a query statement for processing by the production database; the production database in performing runtime execution processing of the query statement identifying one or more query statement value of the query statement; the production database in performing runtime execution processing of the query statement establishing, using a predictive model, an access path based on the identified one or more query statement value; and the production database using the established access path in performing runtime execution processing of the query statement.

20 Claims, 11 Drawing Sheets

MULTIPLE ACCESS PATH SELECTION BY MACHINE LEARNING

BACKGROUND

The present disclosure relates to artificial intelligence (AI) and computer machine learning and particularly to a computer implemented system for facilitating skill assessment among workers.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed (Samuel).

Structured Query Language (SQL) enabled databases that are able to respond to SQL based query statements. SQL is the main specific language that can be used for managing data held in a relationship database management system (RDBMS). SQL can also be used for programming and managing data of a relational data stream management system (RDSMS). SQL can be used for handled structured data where the defined relationships are trained different entities and/or variables of the data. SQL can include various sublanguages including the Data Query Language (DQL), Data Definition Language (DDL), Data Control Language (DCL), and Data Manipulation Language (DML). With the use of SQL various operations can be performed on a database including, e.g. data query, data manipulation (insert, update, and/or delete), data definition (schema creation and modification), and data access control.

SUMMARY

Shortcomings of the prior art are overcome, and additional advantages are provided, through the provision, in one aspect, of a method. The method can include, for example: receiving, by a production database, a query statement for processing by the production database; the production database in performing runtime execution processing of the query statement identifying one or more query statement value of the query statement; the production database in performing runtime execution processing of the query statement establishing, using a predictive model, an access path based on the identified one or more query statement value; and the production database using the established access path in performing runtime execution processing of the query statement.

In another aspect, a computer program product can be provided. The computer program product can include a computer readable storage medium readable by one or more processing circuit and storing instructions for execution by one or more processor for performing a method. The method can include, for example: receiving, by a production database, a query statement for processing by the production database; the production database in performing runtime execution processing of the query statement identifying one or more query statement value of the query statement; the production database in performing runtime execution processing of the query statement establishing, using a predictive model, an access path based on the identified one or more query statement value; and the production database using the established access path in performing runtime execution processing of the query statement.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, by a production database, a query statement for processing by the production database; the production database in performing runtime execution processing of the query statement identifying one or more query statement value of the query statement; the production database in performing runtime execution processing of the query statement establishing, using a predictive model, an access path based on the identified one or more query statement value; and the production database using the established access path in performing runtime execution processing of the query statement.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
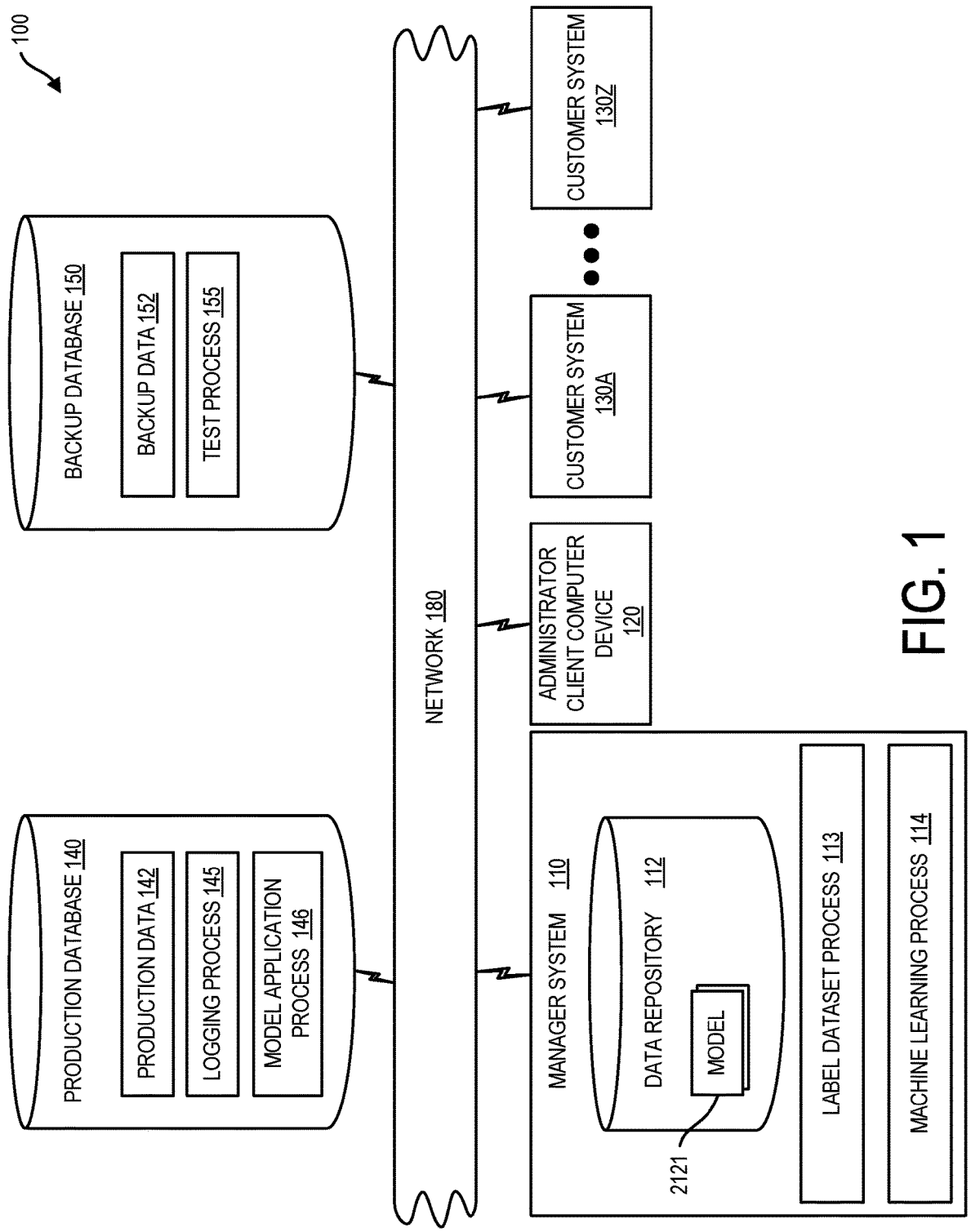
FIG. 1 is a block schematic diagram of a system having a manager system, a production database, and a backup database according to one embodiment.

System 100 for use in presenting database queries is set forth in one embodiment in FIG. 1. System 100 in one embodiment can include manager system 110 having an associated data repository 112, administrator client computer device 120, one or more customer systems 130A-130Z, production database 140, and backup database 150. Manager system 110, administrator client computer device 120, customer systems 130A-130Z, production database 140, and backup database 150 can be provided by computing node based devices and systems and can be in communication with one another via network 180 according to one embodiment. Network 180 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

In one embodiment, each of manager system 110, administrator client computer device 120, production database 140, and backup database 150 can be external to one another, e.g. located on different computing nodes, e.g. different physical computing nodes. In one embodiment, one or more of manager system 110, administrator client computer device 120, production database 140, and/or backup database 150 can be collocated with at least one of manager system 110, administrator client computer device 120, production database 140, and/or backup database 150.

According to one embodiment, production database 140 and backup database 150 can be provided by Structured Query Language (SQL) enabled databases that are able to respond to SQL based query statements. SQL is the main specific language that can be used for managing data held in a relationship database management system (RDBMS). SQL can also be used for programming and managing data of a relational data stream management system (RDSMS). SQL can be used for handled structured data where the defined relationships are trained different entities and/or variables of the data. SQL can include various sublanguages including the Data Query Language (DQL), Data Definition Language (DDL), Data Control Language (DCL), and Data Manipulation Language (DML). With the use of SQL various operations can be performed on a database including, e.g. data query, data manipulation (insert, update, and/or delete), data definition (schema creation and modification), and data access control.

In the course of use of system 100, production database 140 can receive database queries from one or more customer system of customer systems 130A-130Z. Queries received by production database 140 can take the form of query statements such as Structured Query Language (SQL) statements. A query statement can be provided by a static query statement or a dynamic query statement. A static query statement can include a host variable and dynamic query statement can include a parameter marker. An example dynamic query statement is set forth in Table 1 herein below.

TABLE 1

```
SELECT A.C3, B.C3
FROM TEST.TAB_1 AS A,
TEST.TAB_2 AS B
WHERE A.C1 = B.C1
AND A.C2 = :Var_1
AND B.C2 = :Var_2
```

In the example of Table 1, host variables are provided by the variables VAR_1 and VAR_2 which variables can assume values during runtime execution of the query statement. Host variables can be defined directly by statements of the host language or indirectly by query statement extensions. A host variable in a query statement can identify a host variable that is described in the program according to the rules for declaring host variables. A host variable can refer e.g. to a variable in a host language such as a PL/I variable, C variable, Fortran variable, REXX variable, Java variable, COBOL data item, or Assembler language storage area. A host variable can refer e.g. to a host language construct that was generated by an SQL pre-compiler from a variable declared using SQL extensions.

An example of a dynamic query statement is set forth in Table 2 herein below.

TABLE 2

```
SELECT SUM(COL4) AS Summary,
AVG(COL3) AS Average
FROM TABLE (SELECT A.C1, A.C2, B.C1, B.C2
FROM TEST.TAB_1 AS A,
TEST.TAB_2 AS B
WHERE A.C3 = B.C3) AS TEX(COL1, COL2, COL3, COL4)
WHERE TEX.COL2 = ?VAR_1
AND TEX.COL3 <= ?VAR_2
GROUP BY TEX.COL1
HAVING COUNT(*) > 10
```

In the example of Table 2, parameter markers are provided by the variables VAR_1 and VAR_2 which variables can assume values during runtime execution of a query statement. A parameter marker, often denoted by a question mark (?) followed by a variable name (:var1), can be provided by a place holder in an query statement whose value is obtained during statement execution. An application associates parameter markers to application variables. During the execution of the statement, the values of these variables can replace each respective parameter marker.

Query statements processed by production database 140 can include metadata identifiers subject to examination by production database 140. Production database 140 can examine identifiers of a received query statement and can maintain a logging record of received query statements and associated responses.

Embodiments herein recognize drawbacks with existing approaches for processing of query statements. According to one existing approach for processing query statements a production database can establish an access path for use in performing run time execution processing based on cost analysis during bind time processing to analyze different generated candidate access paths. In the case of a static query statement, according to an existing approach, a production database can perform bind time processing for establishing an access path in response to a first receipt of a certain static query statement, and can use the established access path for performing run time execution in response to subsequent receipts of the certain static query statement. In the case of a dynamic query statement, according to an existing approach, a database can perform bind time processing for establishing an access path in response to a first and each subsequent receipt of the certain dynamic query statement. In either the case of processing a static query statement or a dynamic query statement a production database according to an existing approach can establish an access path during bind time processing and can execute the query statement in accordance with the established access path during runtime processing.

Embodiments herein recognize that during such bind time processing according to an existing approach, production database 140 can generate candidate access and can subject the candidate access paths to cost analysis, but recognize that a quality of cost analysis results can be limited by the fact that a query statement value can be unknown at bind time.

Embodiments herein recognize that query statement values, e.g. values of host variable or parameter markers can be unknown during bind time processing and that performance of the established access path may vary significantly for different query statement values which may be unknown during bind time processing. Embodiments herein recognize that an optimized access path for presentment of a query statement can be dependent on one or more query statement value e.g. host variable value or parameter marker value. That is, embodiments herein recognize that a first access path may be optimal in the case the first value is presented for a host variable or parameter marker and a second access path may be optimal when a second value is presented for a host variable or parameter marker. Embodiments herein recognize that values for host variables or parameter markers such as VAR_1 and VAR_2 as set forth in the example of the query statement of Table 1 or Table 2, are not known during bind time. Accordingly, a filter factor of a predicate, e.g. the predicate A.C2 for VAR_1 and B.C2 for VAR_2 may not be estimated precisely.

According to one existing approach for processing of a query statement, a default value can be included as a filter factor when a predicate contains a parameter marker or host variable. Default values can be selected according to a cardinality of a base table which is referenced by the predicate. Embodiments herein recognize that with such an approach, precision of a filter factor may not be accurate.

According to another approach, an automatic rebind can be performed. Embodiments herein recognize drawbacks with an existing approach for processing query statements using an automatic rebind. Using an automatic rebind, an access path in reference to the query statement can be recalculated when a value of a parameter marker or host variable is passed during run time. Embodiments herein recognize that performance can be impacted with such an approach for the reason that recalculating and access path consumes system overhead. Embodiments herein can employ testing of candidate access paths and machine learning for improved presentment of query statements to a production database.

Figure 2:
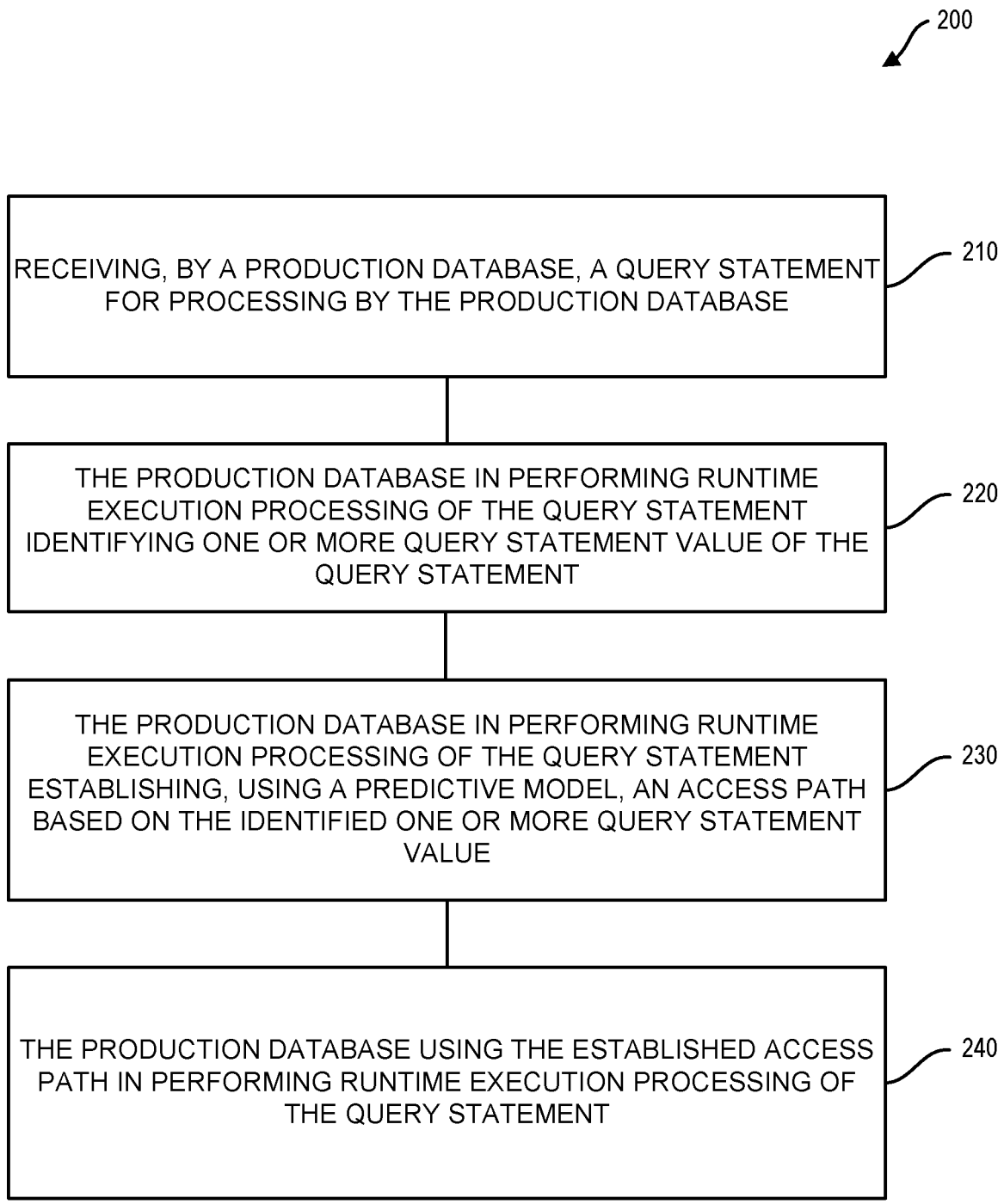
FIG. 2 is a flowchart illustrating a method that can be performed by a manager system according to one embodiment.

A method 200 for performance by system 100 according to one embodiment is set forth in FIG. 2. At block 210 method 200 can include receiving, by a production database, a query statement for processing by the production database. At block 220 method 200 can include the production database in performing runtime execution processing of the query statement identifying one or more query statement value of the query statement. At block 230 method 200 can include the production database in performing runtime execution processing of the query statement establishing, using a predictive model, an access path based on the identified one or more query statement value. At block 240 method 200 can include the production database using the established access path in performing runtime execution processing of the query statement.

An access path can include various characteristics. Characteristics of an access path can include e.g. (a) an access method characteristic, (b) a join sequence characteristic, (c) a join method characteristic, and/or (d) a sort selection characteristic.

An access method characteristic (a) can refer to the manner in which to access a base table. According to one embodiment there can be two ways: (1) table scan (Relational Scan): can refer to scanning the records from this base table from the 1st row to last row, and pick up the rows which qualify predicates specified in SQL; and (2) Index Scan can refer to use of an index to access the records within base tables.

A join sequence characteristic (b) can refer to the 'join order' of two base table joins.

A join method characteristic (c) can refer to the manner in which to connect two tables during join. According to one embodiment, a join method can include e.g. Nest Loop Join, Merge Sort Join, Hybrid Join, and/or Hash Join.

A sort characteristic (d) can refer to the sort operation within a database. Examples can include e.g. GROUP BY, ORDER BY operation.

Performing method 200, production database 140 can feature improved runtime execution performance. Access paths used for performance of runtime execution can be optimized based on identified query statement values identified during runtime execution, and accordingly, performance can remain optimized independent of query statement values identified during runtime execution of a query statement. A predictive model used for establishing an access path can be trained by machine learning using label datasets based on metrics derived in response to application of test data to a database which can be a database of a test environment, e.g. a backup database.

For support of method 200 manager system 110 can include data repository 112 for storing data for use in running various processes. Manager system 110 can run label dataset process 113 and machine learning process 114. Data repository 112 of manager system 110 can store various predictive models in model area 2121. As set forth herein, predictive models of model area 2121 can be trained by machine learning. In response to being queried with a query statement having a query statement value provided by a host variable or predictive model, production database 140 can use a trained predictive model to return the selected access path.

Manager system 110 running label dataset process 113 can present test values to backup database 150. The test values can be based on logging data received from production database 140. The logging data can specify query statement values provided by host variables values or parameter marker values presented for processing to production database 140 during a logging period. Manager system 110 running label dataset process 113 can process returned metrics returned from backup database 150 based on testing performed by backup database 150 using the received test values sent from manager system 110. Based on the returned metrics, manager system 110 running label dataset process 113 can provide a label dataset for use in training a predictive model by machine learning.

Manager system 110 running machine learning process 114 can apply training data to a predictive model 8002 (FIG. 8) by a machine learning process. Machine learning process 114 can use, e.g. a support vector machine (SVM), Bayesian analysis, and/or a neural network. Based on running of machine learning process 114, a predictive model can be trained. The predictive model can predict an optimally performing access path based on an input query statement value provided by a host variable value or parameter marker value. An input query statement value can be input as a request to a predictive model, and the predictive model can return a response. The response can be an access path selection. The selected access path can be the access path predicted to be an optimally performing access path based on the trained predictive model. An optimally performing access path can be optimally performing according to one or more criterion. In one embodiment a criterion can be the criterion that the selected path have a predicted lowest latency. In one embodiment a criterion can the criterion that the selected path have a predicted latency below a threshold latency.

With further reference to FIG. 1, administrator client computer device 120 can display an administrator user interface. An administrator can use the displayed administrator user interface to define configuration data such as configuration data that specifies such items such as a backup schedule, e.g. the schedule by which data of production database 140 is copied into a backup database 150 for backup, and/or a logging schedule, e.g. the schedule by which production database 140 can produce a log of host variable values and/or parameter marker values that have been processed by production database 140 during a logging period. An administrator user can also define using an administrator user interface configuration data that specifies a model update schedule, e.g. a schedule by which predictive models can be updated. An administrator user using an administrator user interface displayed on administrator client computer device 120 in some embodiments can also define configuration data that specifies new query statements to be handled by production database 140 and/or associated candidate access paths that are associated to such new query statements. Query statements can in addition or alternatively be defined by a customer application. Candidate access paths can alternatively or additionally be generated by production database 140 performing bind time processing, e.g. bind time processing including candidate access path generating, cost analysis of the identified candidate access paths, and storing of data specifying the candidate access paths into a catalog table of production database 140.

Production database 140 of system 100 can include production data area 142. Production database 140 can run logging process 145 and model application process 146. Production database 140 can store production data in production data area 142. Production data can be made available for access in response to query statements by one or more customer system of customer systems 130A-130Z that runs a customer application having the query statement. Production database 140 in one embodiment can be a public database available for access by multiple enterprises such as business or other organizational enterprises. Each enterprise corresponding to one of customer systems 130A-130Z. Production database 140 in one embodiment can be a private database available for access by only one enterprise, e.g. a single customer system of customer systems 130A-130Z.

Production database 140 running logging process 145 can log data of received queries provided by query statements received from one or more customer system of customer systems 130A-130Z. The logged data can include data that specifies query statement values provided by host variables or parameter markers identified in response to runtime execution processing of query statements by production database 140. The logged data can include data logged from a logging period. The logging period in one embodiment can refer to the time period from a time of previous logging report to a time of a current logging report. Production database 140 in one embodiment can be configured in accordance with administrator user defined configuration data to report log data iteratively, e.g. at scheduled intervals.

Production database 140 running model application process 146 can apply one or more trained predictive model, trained by manager system 110 running label dataset process 113 and machine learning process 114. The predictive model applied by running of model application process 146 can include a predictive model that predicts an optimally performing access path in response to an identifying of a query statement value e.g. host variable or parameter marker by production database 140. Production database 140 running model application process 146 in response to identifying a query statement value can apply model application process 146 to select a predicted optimally performing access path. A received query statement received by production database 140 can be processed by production database 140 in accordance with the selected access path selected by running of model application process 146.

Backup database 150 can include backup data area 152. Backup database 150 can run test process 155. System 100 can be configured so that production database 140 iteratively copies data of production data area 142 into backup data area 152 of backup database 150. The copying of data from production database 140 to backup database 150 can be iterative, e.g. according to a schedule defined by configuration data specified by an administrator user using an administrator user interface displayed on administrator client computer device 120.

Figure 3:
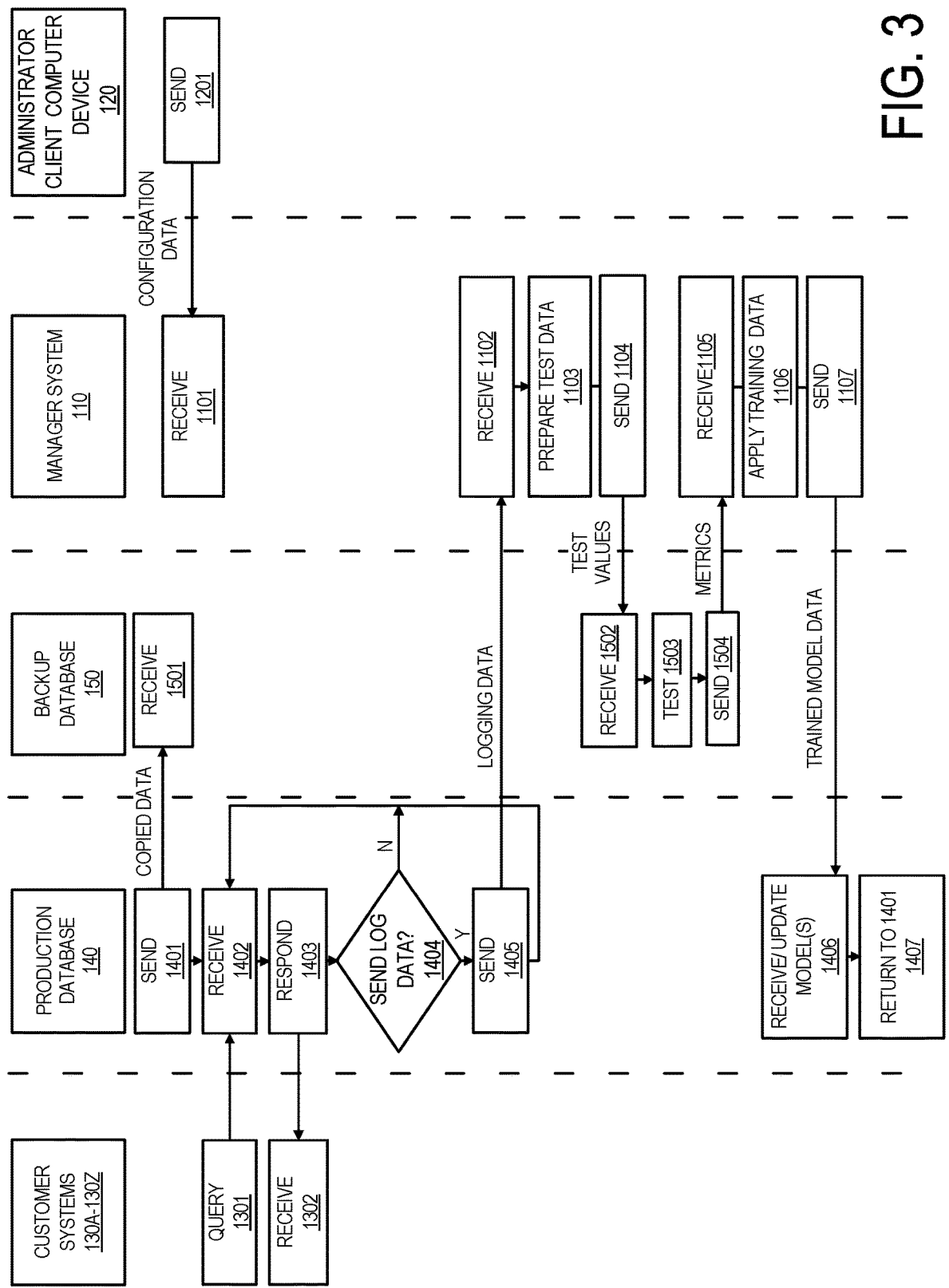
FIG. 3 is a flowchart depicting a method that can be performed by a manager system interoperating with one or more customer system, a production database, a backup database, and an administrator client computer device according to one embodiment.

A specific example of manager system 110 performing method 200 as set forth in the flowchart of FIG. 2 is described with reference to the flowchart of FIG. 3 depicting performance of manager system 110 interoperating with customer systems 130A-130Z, production database 140, backup database 150, and administrator client computer device 120.

Figure 4:
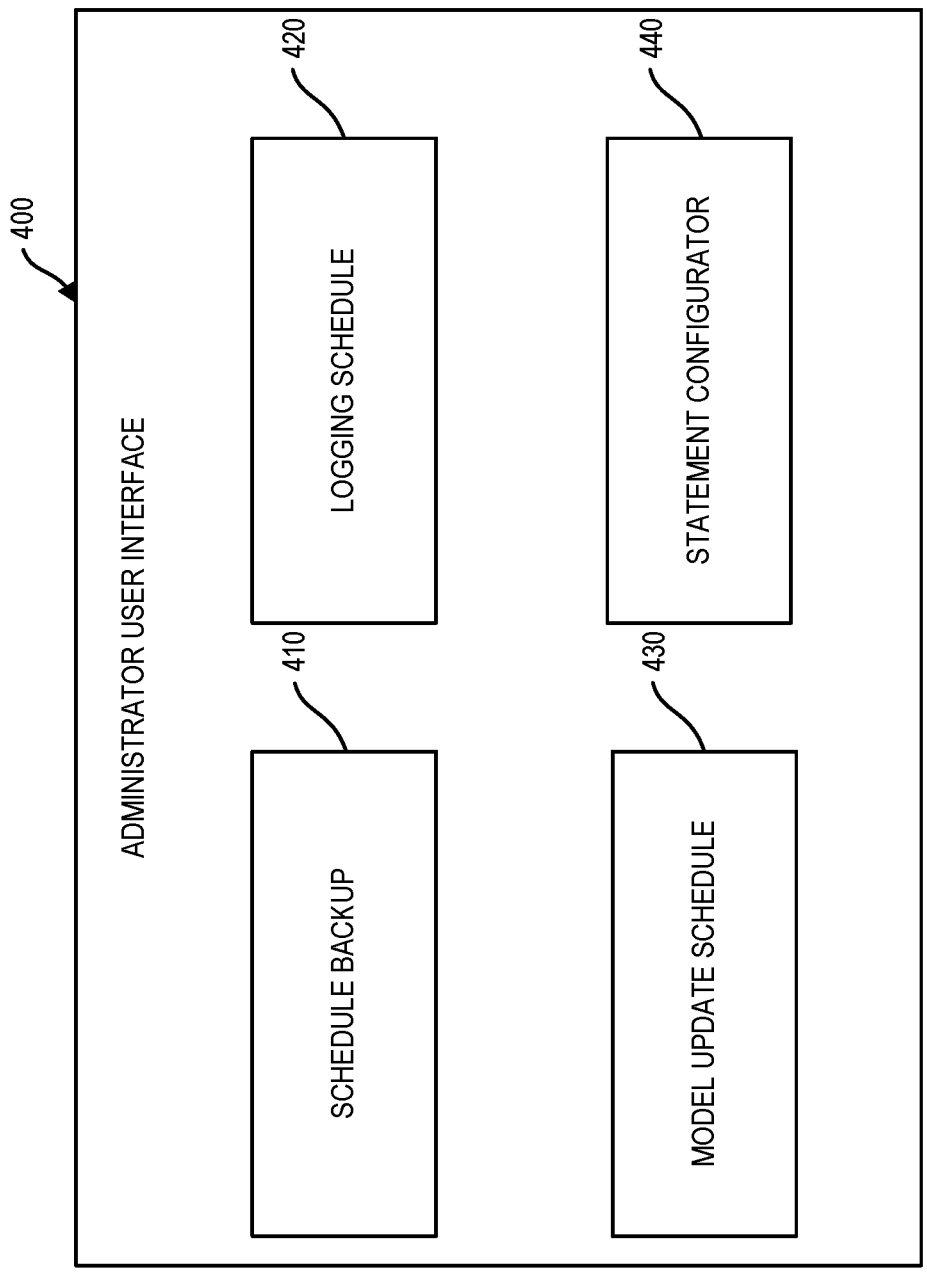
FIG. 4 depicts a displayed administrator user interface that can be displayed on administrator client computer according to one embodiment.

Referring to the flowchart of FIG. 4, manager system 110 at block 1101 can receive configuration data sent from administrator client computer device 120 at block 1201. Configuration data received at block 1101 can include administrator defined configuration data that is specified by an administrator user using an administrator user interface. An exemplary administrator user interface 400 is set forth in FIG. 4. Administrator user interface 400 can be a manually operated displayed user interface that is displayed on a display of an administrator client computer device 120. Using area 410 of administrator user interface 400, an administrator user can specify a backup schedule, e.g. a schedule by which production data of production data area 142 of production database 140 is backed up. Backing up of data can include data of production database 140 being copied into backup database 150. Using area 420 an administrator user using administrator user interface 400 can specify a logging schedule associated with logging process 145 run by production database 140. The administrator user defined logging schedule can be the schedule by which production database 140 reports logged data. Production database 140 running logging process 145 can iteratively report logged data according to a schedule defined by an administrator user using area 420. The logged data can include identified query statement values e.g. host variables or parameter markers within received query statements processed by production database 140 during a logging period. Logging periods can refer to periods between log data report times.

Using area 430 of administrator user interface 400, an administrator user can specify the schedule by which one or more predictive model is updated. In one embodiment, production database 140 can be designed to receive N different query statements. Each of the N different query statements can have a different combination of parameters markers and/or host markers. According to one embodiment, system 100 can train one predictive model for each query statement which a production database 140 is designed to receive and process. An administrator user using model update schedule area 430 of administrator user interface 400 can specify the schedule by which such one or more predictive models are updated. Area 440 of administrator user interface 400 in the exemplary embodiment of FIG. 4 is a statement configurator area that permits the administrator user to specify data on a query statement that is handled by production database 140. From time to time, production database 140 may undergo revisions and during such revisions, new query statements, which production database 140 is designed to handle, can be specified.

In area 440 an administrator user can specify data on new query statements and can also specify candidate access paths that are associated with a given query statement. As set forth herein different access paths can be differentiated by having different characteristics. Characteristics of an access path can include e.g. (a) an access method characteristic, (b) a join sequence characteristic, (c) a join method characteristic, and/or (d) a sort selection characteristic. In on embodiment, production database 140 can perform bind time processing for generating candidate access paths and storing of data specifying the generated access paths into a catalog table of production database 140.

System 100 can be configured so that on receipt of configuration data at block 1101, manager system 110 is configured to run in accordance with administrator defined configuration data received at block 1101. At block 1401 production database 140 can send data copied from production data area 142 of production database 140 to backup data area 152 of backup database 150. During the period of deployment of system 100 production database 140 can iteratively backup its data by copying data of production data area 142 into backup data area 152 of backup database 150. The iterative backing up of data can be performed in accordance with administrator user defined configuration data defined using backup scheduled area 410 of administrator user interface 400 (FIG. 4).

At block 1301 one or more customer system of customer systems 130A-130Z running a customer application can send a query statement for receipt by production database 140 at block 1402. At block 1403 production database 140 can respond to the query statement received at block 1402. The customer system sending the query at block 1301 can receive the query response at block 1302. The query statement sent by the customer system of customer systems 130A-130Z at block 1301 can be processed to return and identify one or more query statement value provided by a host variable value or a parameter marker value. Examples of query statement forms have been set forth herein relative to Table 1 and 2.

Query statements can have varying numbers of lines of code, e.g. ranging from small number of lines of code, e.g. three or less to a large number of lines of code, e.g. tens to hundreds of lines of code. A query statement can have one or more query statement value provided by a host variable value or parameter marker value.

At block 1404 production database 140 can determine whether to send logging data and at block 1405 on the determination that logging data is to be sent can send log data to manager system 110 for receipt by manager system 110 at block 1102. Manager system 110 can determine that logging data is to be sent based on a logging report time being reached as specified in a logging schedule defined by an administrator user using area 420 of administrator user interface 400. Logging data from production database 140 can be iteratively sent based on a logging schedule defined by administrator defined configuration data defined using area 420 of administrator user interface 400 (FIG. 4). Logging data sent at block 1405 can include data specifying query statement values included in query statements received and processed by production database 140 during a logging period. The logging period can be a period between a first logging data report time and a second logging data report time.

In the case that a logging reporting time has not yet been reached (block 1404) production database 140 can iteratively perform blocks 1402, 1403, and 1404 in an iterative loop and during performance of such iterative loop, can respond to query statements sent from one or more customer system of customer systems 130A-130Z and can iteratively respond to such query statements at block 1403 by sending response data to the one or more customer system sending the query statements.

As seen by the loop defined by blocks 1402, 1403, 1404, and 1405 production database 140 can be iteratively receiving query statements from one or more customer system of customer systems 130A-130Z and the one or more customer system of customer systems 130A-130Z can be iteratively receiving responses to such queries.

In providing a response at block 1403, production database 140 can process a query statement using one or more predictive model trained by manager system 110 running label dataset process 113 and machine learning process 114. Production database 140 can use a predictive model to select an access path. The predictive model for example can be a predictive model that has been pushed from data repository 112 (model area 2121) of manager system 110 to production database 140. Production database 140 can run model application process 146 to apply a predictive model for selection of an access path in response to receiving a query statement (block 1402 and block 1403).

Where a received query statement received at block 1402 is a first time received static query statement or a dynamic query statement, processing at block 1403 can include performing bind time processing for generating a set of one or more candidate access paths. For a first time received static query statement, production database 140 can generate candidate access paths based on determined attributes of the received query statement. The candidate access paths can include combinations of access path characteristics that are valid in view of the determined attributes. Production database 140 during bind time processing can select for the ensuing runtime execution a determined optimally performing candidate access path using a cost analysis, and, in accordance with embodiments set forth herein can store data specifying the identified candidate access paths into a catalog table of production database 140. The data specifying the candidate access paths can later be accessed by system 100 for performance of testing for return of performance metrics as set forth herein.

In the case of static query statement, according to one embodiment, a set of candidate access paths comprising a plurality of candidate access paths can be generated by production database 140 with a single bind time processing of a first time received query statement. In the case of dynamic query statement, according to one embodiment, production database 140 can provide a set of candidate access paths comprising a plurality of candidate access paths for a certain dynamic query statement by accumulating into a catalog table of production database 140 candidate access paths generated over a succession of bind time processing periods associated with succession of receipts of the certain dynamic query statement. Bind time processing as set forth herein to generate a candidate access path can include performing a cost analysis to identify an access path featuring optimal performance according to one or more criterion, and in accordance with aspects set forth herein, storing of data specifying the generated candidate access paths into a catalog table for production database 140 for later use by system 100 e.g. for use by system 100 in the performance of testing for return of performance metrics and providing of label datasets as set forth herein.

Where a received query statement received at block 1402 is a received query statement received with candidate access paths generated and stored in a catalog of production database 140, and with a predictive model as set forth herein trained, processing at block 1403 can include performing runtime execution processing in which a trained predictive model can be used for selection of access path among the set of candidate access paths. On receipt of a query statement, production database 140 can examine a metadata identifier of a query statement. Generated access paths can be stored in a catalog table of production database 140 associated to the query statement identifier so that the candidate access paths can be later accessed based on an examination of the query statement identifier on receipt of a subsequent query statement having the query statement identifier.

In response to receipt of logging data at block 1102, manager system 110 can proceed to block 1103 to prepare test data. Preparing test data at block 1103 can include processing of logging data received at block 1102. According to one embodiment, preparing test data at block 1103 can include identifying query statement values provided by host variable values and/or parameter marker values returned by production database 140 processing received query statements during a logging period to which the logging data received at block 1102 pertains. Logged query statement values can be associated to identifiers of query statements to which they pertain.

At block 1104, manager system 110 can send test values to backup database 150 for receipt by backup database at block 1502. The test values can include, e.g. identified query statement values provided by host variables and/or parameter marker variables specified within logging data received at block 1102 associated to processed query statements processed during a logging period. In response to receipt of test values at block 1504, backup database 150 can perform a test.

Backup database 150 performing a test can include backup database 150 activating test process 155 (FIG. 1). Backup database 150 performing test process 155 can include backup database 150 processing query statements having prespecified historical query statement values, e.g. historical host variable values and/or parameter marker values in accordance with a plurality of defined candidate access paths for each of one or more query statement. Specifying data for the defined candidate access paths for a certain query statement can be read from the catalog table specifying data of generated candidate access paths stored in production database 140 as described in connection with block 1403. Specifying data specifying generated candidate access paths stored as described in reference to block 1403 can be copied into backup database 150 during scheduled backups of production database 140. Accordingly, backup database 150 for performance of a test at block 1503 can read candidate access path specifying data from a catalog table that has been copied into backup database 150.

Backup database 150 performing test at block 1503 can include backup database 150 running test process 155 (FIG. 1). For performance of test process 155 backup database 150 can apply each of several sets of historical values to processing by backup database 150 in accordance with a plurality of generated candidate access paths. Each candidate access path can be differentiated, e.g. in terms of one or more of, (a) an access method characteristic, (b) a join sequence characteristic, (c) a join method characteristic, and/or (d) a sort selection characteristic. Each set of historical values can include one or more historical value. The one or more historical value can include, e.g. one or more of a host variable value or a parameter marker value. Use of backup database 150 rather than production database 140 to perform a test for return of metrics facilitates access to production database 140 by customer systems 130A-130Z on an ongoing uninterrupted basis. According to one embodiment, production database 140 can be used for performance of a test for return of metrics. Each access path can have a plurality of differentiated characteristics as set forth herein.

The different candidate access paths that can be used for processing query statements with historical query statement values during a test can be differentiated, e.g. in terms of e.g. (a) an access method characteristic, (b) a join sequence characteristic, (c) a join method characteristic, and/or (d) a sort selection characteristic.

An access method characteristic (a) can refer to the manner in which to access a base table. According to one embodiment there can be two ways: (1) table scan (Relational Scan): can refer to scanning the records from this base table from the 1st row to last row, and pick up the rows which qualify predicates specified in SQL; and (2) Index Scan can refer to use of an index to access the records within base tables.

Figure 5:
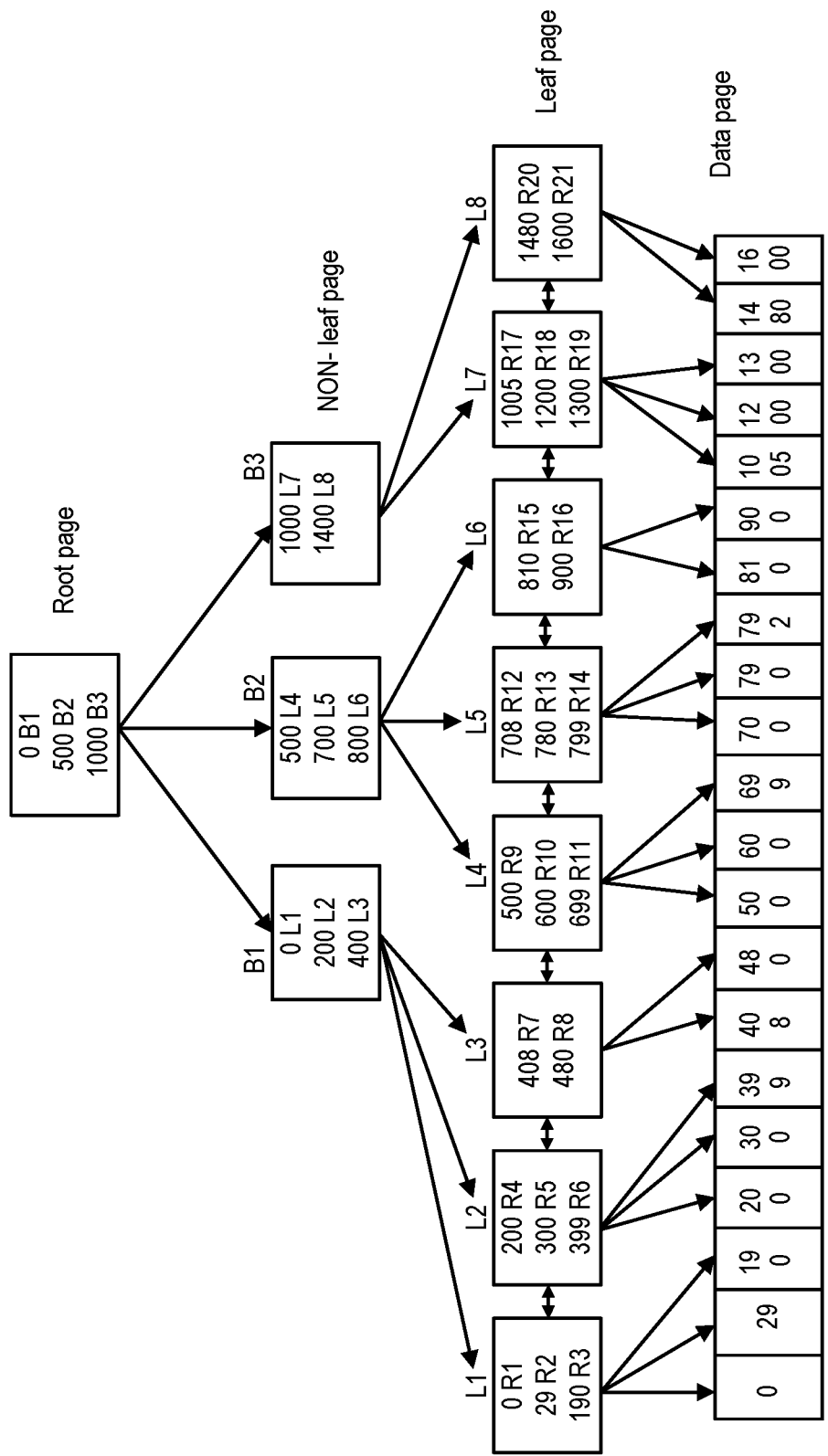
FIG. 5 is a diagram depicting an access method that can be performed in accordance with a differentiated access path according to one embodiment.

Production database 140 performing a table scan can e.g. according to one embodiment, read all rows of a table and apply one or more selection criterion to rows within a table. The rows in a table can be processed without a guaranteed order, but typically can be processed sequentially. For certain query statement values, a table scan can reduce page I/O operations through asynchronous pre-fetching of rows. Production database 140 according to one embodiment can request large I/Os to bring as many rows as possible into main memory for processing, and can asynchronously pre-fetch data for assurance that a table scan operation does not wait for rows to be paged into memory. According to an index scan as depicted in FIG. 5 production database 140 can access an index to narrow a set of qualifying rows, e.g. by scanning rows in a specified range of the index. When scanning rows in a specified range of an index, production database 140 can determine an index scan range by values of a query statement against which index columns are being compared. In the case of an index-only scan, because all of the requested data is in the index, production database 140 may not access an indexed table.

A join sequence characteristic (b) can refer to the join 'order' of two base table joins, e.g. an Inner Join or an Outer Join.

Figure 6:
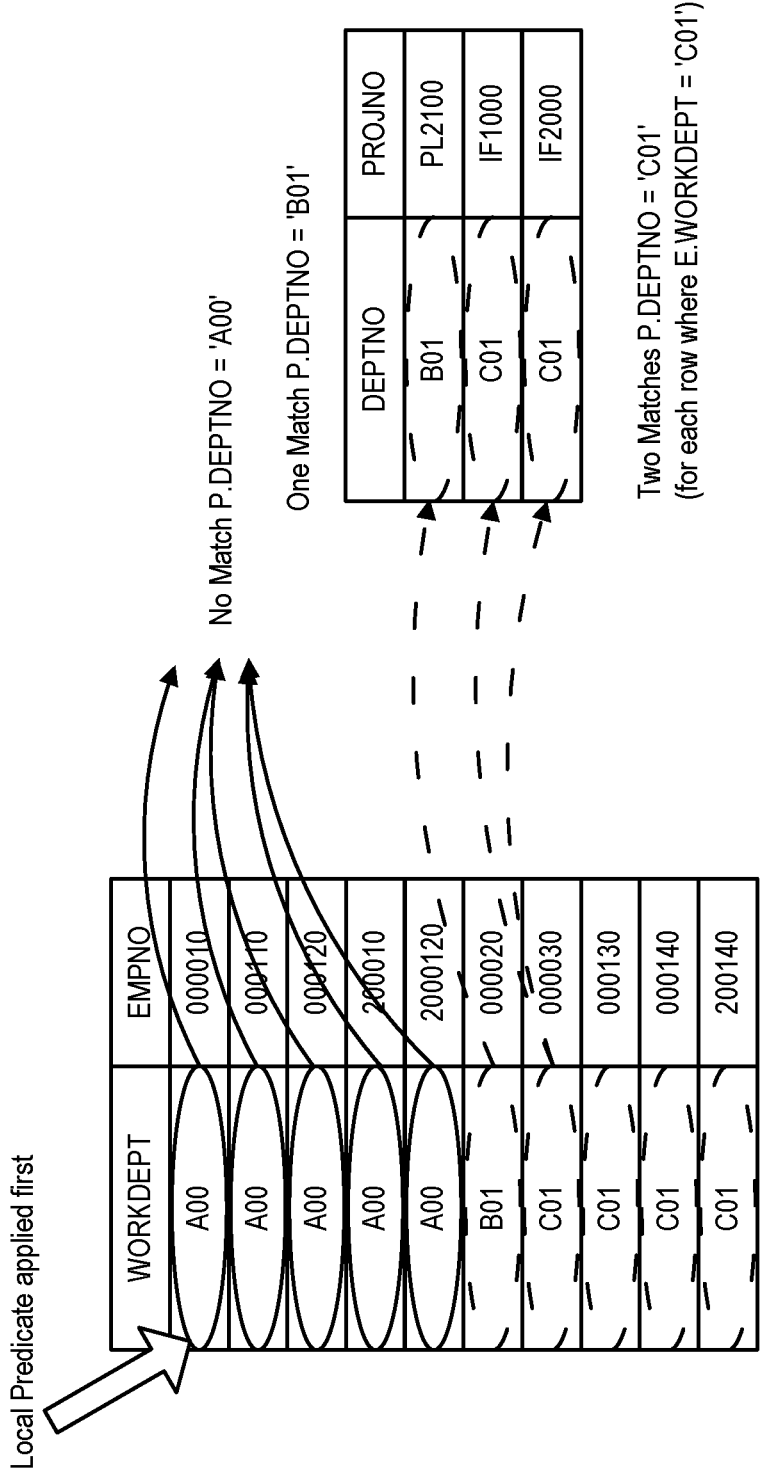
FIG. 6 is a diagram depicting a join sequence that can be performed in accordance with differentiated access path according to one embodiment.

A join method characteristic (c) can refer to the manner in which to connect two tables during join. According to one embodiment, a join method can include e.g. Nest Loop Join, Merge Sort Join, Hybrid Join, and/or Hash Join. FIG. 6 depicts a Nest Loop Join, for example. According to a Nest Loop Join, there can be performed e.g. a scan of an inner table for each accessed row of an outer table, or an index lookup on an inner table for each accessed row of an outer table.

A sort characteristic (d) can refer to the sort operation within a database. Examples can include e.g.: GROUP BY, ORDER BY operation.

Figure 7:
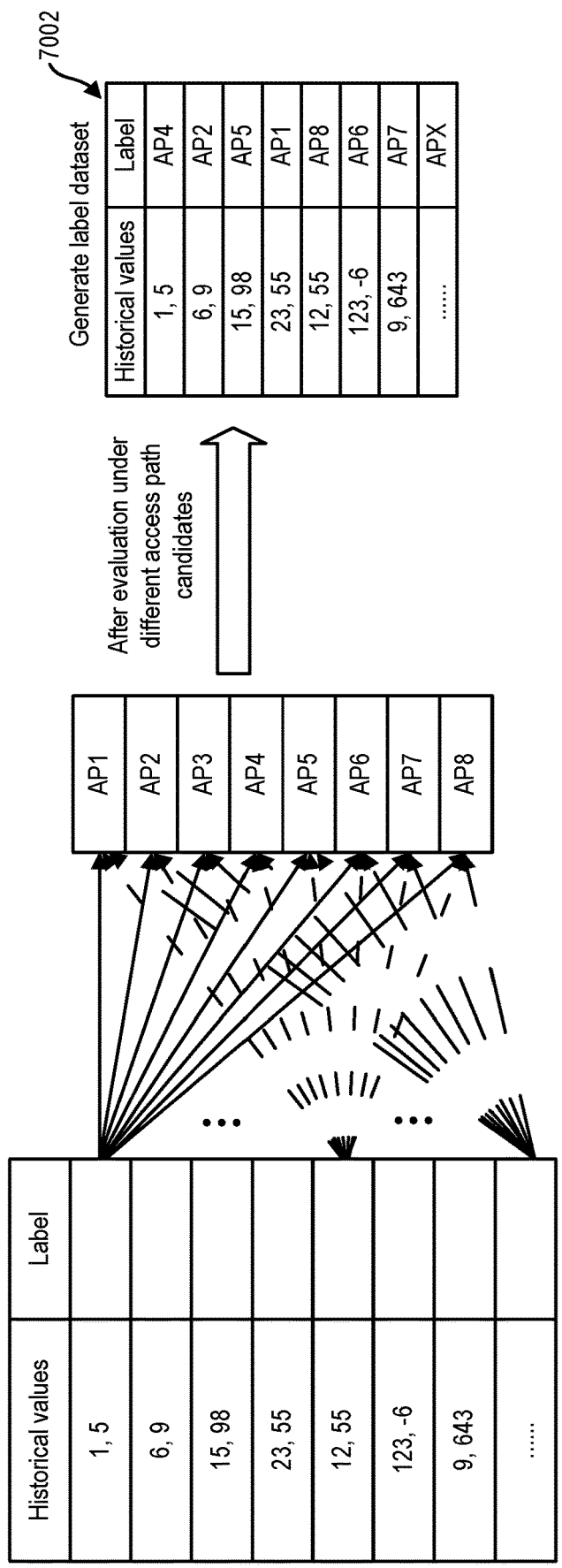
FIG. 7 is a diagram depicting operation of testing that can be performed with use of a backup database according to one embodiment and further depicts a label dataset that can be provided by a manager system according to one embodiment.

Operation of backup database 150 for performing of test process 155 according to one embodiment is depicted in FIG. 7. In FIG. 7 there are depicted a plurality of sets of historical values, e.g. the historical value of 1, 5, the historical value of 5, 6, the historical value of 15, 98, and so on. The historical values can be historical values that specify query statement host variable values provided by host variable values or parameter marker values according to one embodiment.

Figure 9:
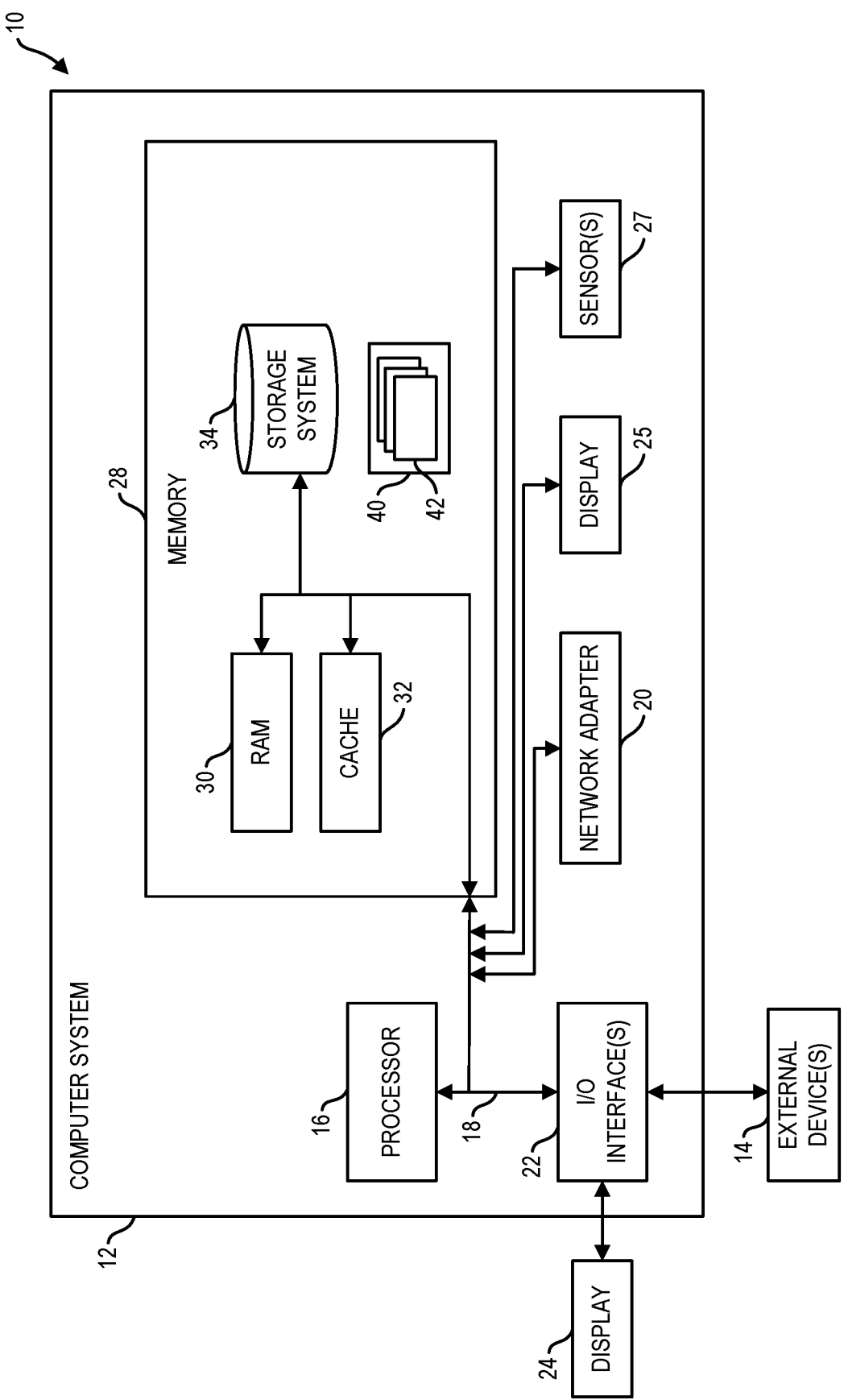
FIG. 9 depicts a computing node according to one embodiment.

Each of the plurality of sets of historical values can be processed by backup database 150 according to a plurality of candidate access paths. For example, access path AP1, access path AP2, access path AP3, access path AP4, access path AP5, access path AP6, access path AP7, and access path AP8 are depicted in FIG. 9. Each query statement processed by production database 140 can be associated to a different set of candidate access paths. The different access paths of a set of access paths associated to a query statement can be differentiated based on one or more of a) an access method characteristic, (b) a join sequence characteristic, (c) a join method characteristic, and/or (d) a sort selection characteristic. The different access paths applied by backup database 150 can be generated by production database 140 during bind time processing as set forth herein at block 1403 and/or can be based on configuration data specified by an administrator user using administrator user interface 400 (FIG. 4), which configuration data can be pushed by manager system 110 to backup database 150 for purposes of configuring test process 155 (FIG. 1).

Referring again to the flowchart of FIG. 4, backup database 150 at block 1504 can send metrics to manager system 110 for receipt by manager system 110 at block 1105. The metrics sent by backup database 150 to manager system 110 at block 1504 can include metrics resulting from processing of each of the different sets of historical query statement values depicted in FIG. 7, in accordance with each of the plurality of candidate access paths, e.g. access path 1 (AP1) to access path 8 (AP8).

According to one embodiment, the sent metrics sent at block 1504 can include latency metrics. The latency metrics can specify a consumed time period for processing of the specified historical query statement values in accordance with each of the candidate access paths (AP1-AP8). According to one embodiment the metrics can specify different latency periods for each of the different access paths.

Continuing with reference to the flowchart of FIG. 3, manager system 110 in response to receipt of metrics at block 1105 can proceed to block 1106. At block 1106 manager system 110 can apply training data to a machine learning process. Applying training data to to machine learning process can include manager system 110 activating machine learning process 114. Manager system 110 performing preparing test data at block 1103 can include manager system 110 activating label dataset process 113 to provide a label dataset for application to a machine learning process. Manager system 110 determining a label dataset can include manager system 110 sending test values at block 1105, receiving return metrics at block 1105 and determining a label dataset based on the received metrics received at block 1105.

An example of a label dataset 7002 is depicted in FIG. 7. As noted, the received metrics received at block 1105 can include metrics specifying different latency periods for each of the different access paths depicted in FIG. 7, namely, access paths AP1-AP8. For determining a label dataset based on received metrics, manager system 110 at block 1105 can examine the metrics. According to one embodiment, examining metrics received at block 1105 can include examining the metrics to determine a lowest latency among the plurality of candidate access paths AP1-AP8 and providing the lowest latency access path as part of label dataset data to be associated with a set of historical query statement values.

In FIG. 7 there is depicted a label dataset 7002. Label dataset 7002 can include a set of historical query statement values of a query statement with a label that specifies a lowest latency candidate access path associated that set of historical query statement values. For example, in accordance with label dataset 7002 the historical values 1, 5 are associated to access path AP4 which is the lowest latency access path of the candidate access paths AP1-AP8. In dataset 7002, the historical values 6, 9 are associated to candidate access path AP2. Based on AP2 returning the lowest latency metric out of the plurality of access paths AP1-AP8 used for testing a set of historical values 6, 9 at test block 1503. In label dataset 7002 each set of historical values, e.g. 1, 5; 6, 9, and so forth is associated to a candidate access path which during test block 1503 returned the lowest latency performance metric out of the plurality of candidate access paths AP1-AP8.

Figure 8:
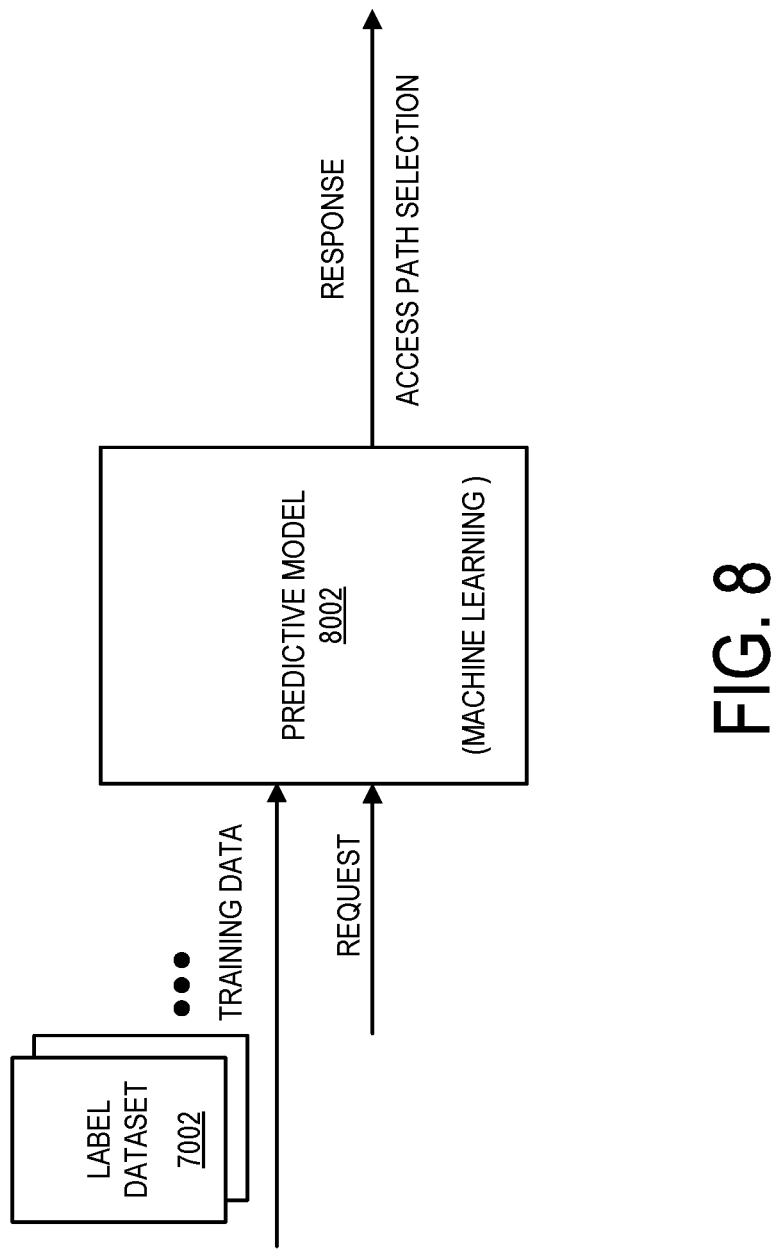
FIG. 8 depicts a predictive model that can be trained by machine learning according to one embodiment.

Manager system 110 performing applying of training data at block 1106 and activating machine learning process 114 are depicted in FIG. 8. Performing of machine learning process 114 can include training of a predictive model, using training data. Machine learning process 114 can use, e.g. a support vector machine (SVM), Bayesian analysis, and/or a neural network. Based on running of machine learning process 114, a predictive model can be trained.

Manager system 110 performing machine learning process 114 can include manager system 110 training predictive model 8002 depicted in FIG. 8. Training of predictive model 8002 can include applying training data to predictive model 8002. The applied training data can include known and determined input values and output values input into a database which database can be provided by backup database 150. The known input values can include, e.g. sets of historical query statement values (historical values) and the known output values can be the known lowest latency determined access paths determined with use of backup database 150 performing test process 155 (FIG. 1). Embodiments herein recognize that a machine learning process as depicted in FIG. 8 defines a supervised machine learning process wherein known inputs (historical query statement values) and known outputs (optimal access path) are applied as training data. Based on applied training data, predictive model 80002 can provide a prediction of an optimized access path on receipt of a request provided by newly identified query statement value. Various available tools, libraries, and/or services can be utilized for implementation of predictive model 8002. For example. a machine learning service provided by IBM® WATSON® can provide access to libraries of APACHE™ and SPARK™ and IBM® SPSS® (IBM® WATSON® and SPSS® are registered trademarks of International Business Machines Corporation and APACHE™ and SPARK™ are trademarks of the Apache Software Foundation. A machine learning service provided by IBM® WATSON® can provide access to a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

With predictive model 8002 trained with use of sets of known inputs and known outputs predictive model 8002 can be configured to predict an optimally performing access path on receipt of a request specifying one or more query statement value. Training data applied to predictive model 8002 depicted in FIG. 8 can include label dataset 7002 described with reference to FIG. 7 according to one embodiment. For training of predictive model 8002 instances of label dataset 7002 can be iteratively applied as training data to predictive model 8002 for iterative training of predictive model 8002. Manager system 110 can iteratively determine new instances of label dataset 7002 over time. For example, manager system 110 can determine a first instance of label dataset 7002 during a first iteration of receive block 1105 as depicted in the flowchart of FIG. 3 and can determine a second instance of the label dataset 7002 during a second iteration of receive block 1105 as depicted in the flowchart of FIG. 3 (a second passthrough of the processing flow depicted by blocks 1102, 1103, 1104, 1502, 1503, 1504, and 1105 as depicted in the flowchart of FIG. 3) and so on. Through each new iterative pass, manager system 110 can return a new instance of label dataset 7002 and can apply the new instance of label dataset 7002 as training data for training predictive model 8002, thus provisioning predictive model 8002 so that predictive model 8002 can more. accurately return a prediction of an optimally performing access path.

Referring again to FIG. 7 label dataset 7002 can include in one embodiment specifier for the lowest latency candidate access path of the set of candidate access paths AP1-AP8. In another embodiment the label dataset 7002 that can be used as training data can include information in addition to the lowest latency candidate access path. For example, label dataset 7002 can include information of a ranking of all access paths AP1-AP8 in an order of their latency. Label dataset 7002 can include data that applies different weights for the different candidate access paths in accordance with the different latencies associated to the various candidate access paths AP1-AP8.

Referring again to FIG. 8, predictive model 8002 on being trained using iteratively applied training data, can be configured to respond to requests. A request can be provided by an identified query statement value identified by production database 140 based on a processing of a received query statement received by production database 140. In response to an identified query statement value provided by host variable value or parameter marker value applied as a request to predictive model 8002, predictive model 8002 can return a response specifying an optimal access path selection associated to that identified query statement value provided by a host variable value or parameter marker value.

Returning to the flowchart of FIG. 3, with predictive model 8002 trained at block 1106 manager system 110 can proceed to block 1107. At block 1107, manager system 110 can send trained model data to production database 140 for receipt by production database 140 at block 1406. At block 1406 production database 140 can receive the trained model data and can responsively update trained model(s). Production database 140 can include a trained predictive model for each query statement received and processed by production database 140. Each trained predictive model 8002 can be associated to an identifier of a query statement to which the trained predictive model is associated. Thus, production database 140 by examining an identifier a received query statement can activate a trained predictive model associated to the received query statement.

Trained predictive model(s) iteratively trained with use of instances of label dataset 7002 can be used by production database 140 for receipt and processing of query statements in accordance with model application process 146 as set forth herein. As set forth herein, trained model data sent by manager system 110 can include trained model data for more than one predictive model 8002. For example, where production database 140 handles N different query statements, manager system 110 at block 1107 can send trained model data for updating predictive models associated with N predictive models, there being one predictive model associated with each query statement which production database 140 is configured to handle.

On receipt of trained model data at block 1406, and updating of predictive model(s) at block 1406, production database 140 can proceed to block 1407. At block 1407, production database 140 can return to block 1401 to perform a next backup by copying of production data of production data area 142 of production database 140 into backup data area 152 of backup database 150. The iterative backup of production database 140 can assure that backup database accurately reflects the data environment defined by production database 140 when performing a test at block 1503.

At blocks 1402 and 1403, production database 140 can receive and iteratively respond to queries from one or more customer system of customer systems 130A-130Z. In performing responses to queries at block 1403, production database 140 can run model application process 146 (FIG. 1) to apply updated predictive model(s) updated based on received trained model data received at block 1406.

Production database 140 performing respond block 1403 can include production database 140 running model application process 146. In accordance with model application process 146, production database 140 can examine an identifier of a received query statement received from a customer system of customer system 130A-130Z. At block 1402 production database 140 for providing a response can perform runtime execution of the query statement. In the performance of runtime execution, production database 140 and can identify a query statement value provided by a host variable value or parameter marker value returned by performing runtime execution of the received query statement received from a customer system of customer systems 130A-130Z. Referring again to FIG. 8 production database 140 can use the identifier to activate trained predictive model 8002 associated to the query statement and the identified host variable value or parameter marker value can be applied to trained predictive model 8002 as a request and predictive model 8002 in accordance with model application process 146 can return an access path selection. A returned access path can be a predicted optimally performing access path determined to be optimally performing by predictive model 8002 which has been trained in accordance with training data on an iterative basis by performance of applying training data block 1106 as set forth herein. The intelligently selected access path selected with use of a predictive model 8002 can significantly reduce time consumption associated with a processing of a received query statement.

There is set forth herein receiving by a production database 140 a query statement for processing by the production database 140; the production database 140 in performing runtime execution processing of the query statement identifying one or more query statement value of the query statement; the production database 140 in performing runtime execution processing of the query statement establishing, using a predictive model 8002, an access path e.g. one of AP1-AP8, based on the identified one or more query statement value; and the production database using the established access path in performing runtime execution processing of the query statement. There is set forth herein the production database 140 responsively to receiving the query statement examining metadata of the query statement specifying an identifier of the query statement, and using the identifier to activate the predictive model 8002 out of a plurality of candidate predictive models associated to the query statement.

There is set forth herein training the predictive model 8002 by machine learning, wherein the training includes iteratively obtaining logging data from the production database 140, the logging data including historical values, iteratively sending test values to a backup database of the production database, the test values being based the logging data, iteratively receiving return metrics from the backup database 150, and examining the returned metrics to iteratively provide a label dataset and iteratively applying the label dataset to the predictive model as training data to train the predictive model, wherein the backup database subjects the test values to processing by alternative candidate access paths, and wherein the return metrics include performance metrics associated to the alternative candidate access paths, and wherein the alternative candidate access paths include first and second access paths that are differentiated by having at least one different characteristic, the at least one different characteristic being selected from the group consisting of (a) a different access method, (b) a different join sequence, (c) a different join method, and (d) a different sort operation, and wherein the alternative candidate access paths are generated by the production database 140 performing a bind time process in response to receiving the query statement a first time.

Certain embodiments herein may offer various technical computing advantages involving computer advantages to address problems arising in the realm of computer networks and computer systems. Embodiments herein can improve the performance of a computer system defining a database such as a relational database. Embodiments herein can employ machine learning processing to facilitate access path selection in response to receipt and processing of a query statement. A production database can use a predictive model trained by machine learning to intelligently select optimally performing access paths based on data of received query statements from customer systems. Embodiments herein can avoid drawbacks associated with existing approaches for processing query statements received by a production database, such as the situation where an access path performs poorly for certain query statement values. Embodiment herein facilitate adaptive selection of an access path based on an identified value of a host variable or parameter marker of query statement. Embodiments herein can perform logging of a production database to log values of parameter markers or host variables of query statement received and processed by a production database during production use during a logging period. Based on the identified parameter markers or host variables, embodiments herein can perform testing with use of a backup database. Use of a backup database avoids interruptions of servicing performed by a production database. Application of test values to a backup database for performing of testing using a backup database commonly observed parameter markers or host variables can be subject to testing using a plurality of candidate access paths and metrics can be returned and examined to determine a label dataset. A returned label dataset can be applied with use of a machine learning process to a predictive model so that a predictive model is trained in accordance with training data provided by the label dataset.

Figure 10:
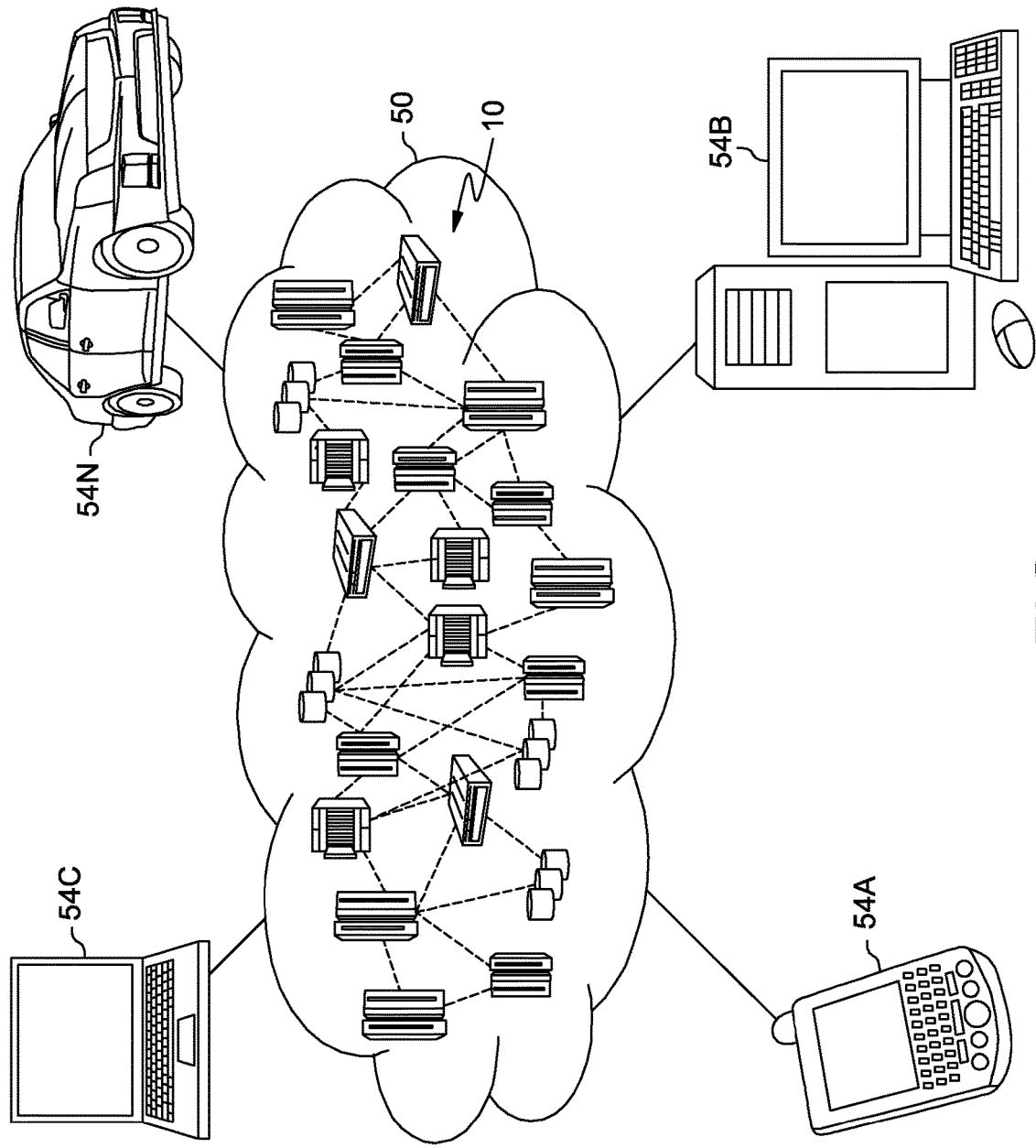
FIG. 10 depicts a cloud computing environment according to one embodiment.
Figure 11:
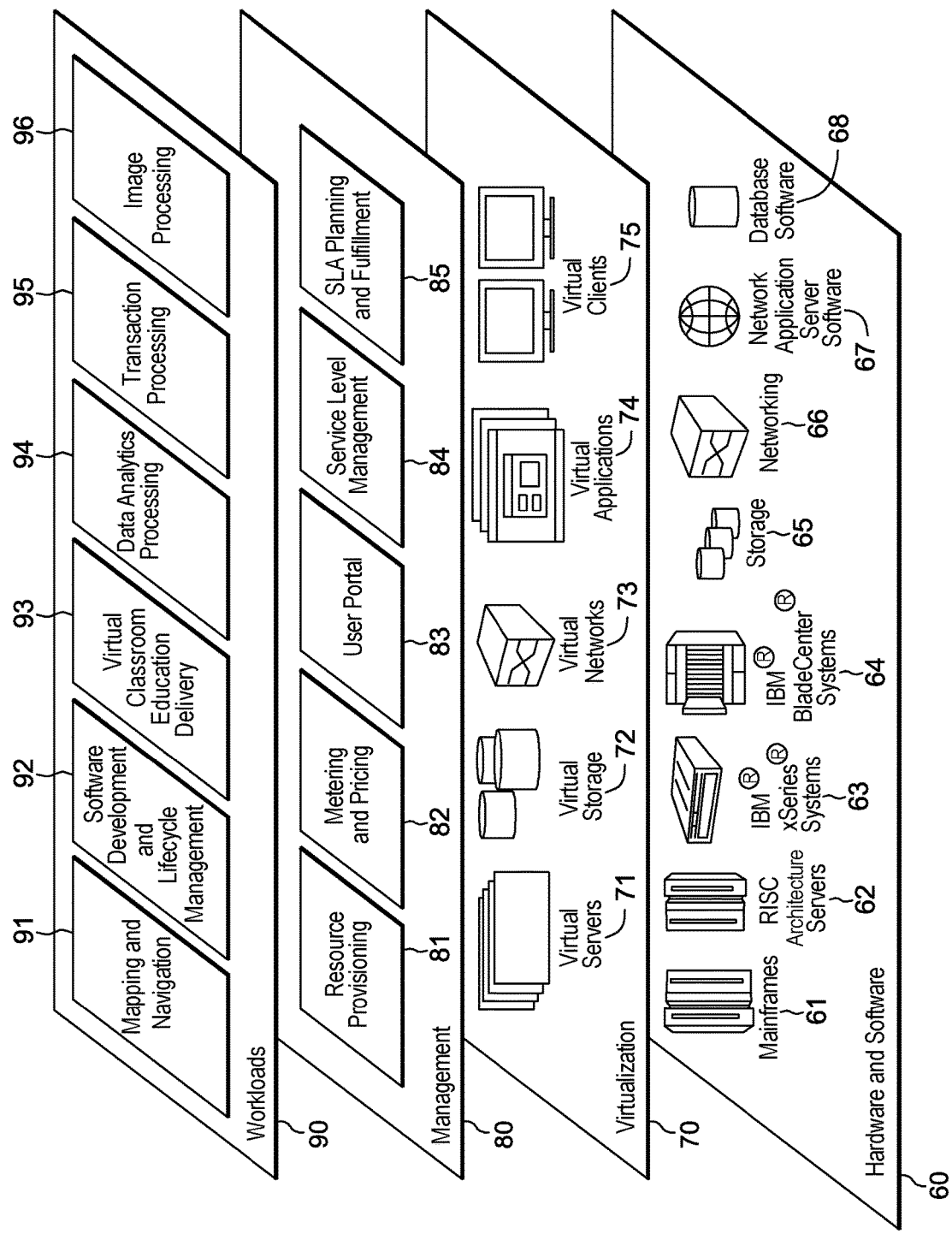
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to method 200 of FIG. 2 and functions described with reference to manager system 110 as set forth in the flowchart of FIG. 3. In one embodiment, production database 140 can include one or more computing node 10 and can include one or more program 40 for performing functions described with reference to production database 140 as set forth in the flowchart of FIG. 3. In one embodiment, backup database 150 can include one or more computing node 10 and can include one or more program 40 for performing functions described with reference to backup database 150 as set forth in the flowchart of FIG. 3. In one embodiment, administrator client computer device 120 can include one or more computing node 10 and can include one or more program 40 for performing functions described with reference to administrator client computer device 120 as set forth in the flowchart of FIG. 3. In one embodiment, customer systems 130A-130Z can include one or more computing node 10 and can include one or more program 40 for performing functions described with reference to customer systems 130A-130Z as set forth in the flowchart of FIG. 3. In one embodiment, the computing node based devices and systems depicted in FIG. 1 can include one or more program for performing function described with reference to such computing node based devices and systems.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for database access path selection set forth herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
    receiving, by a production database, a query statement for processing by the production database;
    the production database in performing runtime execution processing of the query statement identifying one or more query statement value of the query statement;
    the production database in performing runtime execution processing of the query statement establishing, using a predictive model, an access path based on the identified one or more query statement value; and
    the production database using the established access path in performing runtime execution processing of the query statement, wherein the predictive model is a trained predictive model trained by machine learning, wherein training of the predictive model includes iteratively obtaining logging data from the production database, the logging data including historical values, iteratively sending test values to a backup database of the production database, the test values being based the logging data, iteratively receiving return metrics from the backup database, and examining the returned metrics to iteratively provide a label dataset and iteratively applying the label dataset to the predictive model as training data to train the predictive model, wherein the backup database subjects the test values to processing by alternative candidate access paths, and wherein the return metrics include performance metrics associated to the alternative candidate access paths.

2. The method of claim 1, wherein the method includes performing by the production database a first time the query statement is received, a bind time process in which candidate access paths are generated, and storing the candidate access paths in a catalog table of the production database.

3. The method of claim 1, wherein the method includes performing by the production database a first time the query statement is received, performing a bind time process in which candidate access paths are generated, and storing the candidate access paths in a catalog table of the production database, and wherein the establishing includes selecting an access path of the candidate access paths.

4. The method of claim 1, wherein the method includes the production database responsively to receiving the query statement examining metadata of the query statement specifying an identifier of the query statement, and using the identifier to activate the predictive model out of a plurality of candidate predictive models.

5. The method of claim 1, wherein training of the predictive model includes obtaining logging data from the production database, the logging data including historical statement values associated to the query statement, sending test values to a backup database of the production database, the test values being based the logging data, receiving return metrics from the backup database, and examining the returned metrics to provide a label dataset and applying the label dataset to the predictive model as training data to train the predictive model.

6. The method of claim 1, wherein the alternative candidate access paths include first and second access paths that are differentiated by having at least one different characteristic, the at least one different characteristic being selected from the group consisting of (a) a different access method, (b) a different join sequence, (c) a different join method, and (d) a different sort operation.

7. The method of claim 1, wherein the alternative candidate access paths include first and second access paths that are differentiated by having at least one different characteristic, the at least one different characteristic being selected from the group consisting of (a) a different access method, (b) a different join sequence, (c) a different join method, and (d) a different sort operation, and wherein the alternative candidate access paths are generated by the production database, in response to receiving the query statement a first time, performing a bind time process.

8. The method of claim 1, the training being performed by a manager system external from the production database, the logging data including historical values provided by identified query statement host variable values identified by the production database processing received query statements during a logging period, iteratively sending test values to a backup database of the production database, the backup database being external to the production database and the manager system, the test values being based the logging data and including respective sets of host variable values of the identified query statement host variable values, iteratively receiving return metrics from the backup database, wherein the backup database subjects the test values provided by respective sets of host variable values to processing by alternative candidate access paths, and wherein the return metrics include performance metrics including observed latencies associated to the alternative candidate access paths for the respective sets of host variable values, wherein during the course of deployment of the production database, the production database iteratively copies its data into the backup database, wherein the logging data is sent according to a logging schedule, wherein the iteratively applied training dataset incudes for respective iterations of the training dataset (a) a set of host variable values, and (b) candidate access path latency data associated to the set of host variable values, wherein the method includes the manager system iteratively sending retrained versions of the predictive model to the production database for updating of the predictive model by the production database.

9. The method of claim 1, wherein the method includes
receiving from the production database logging data, the logging data including sets of query statement host variable values, wherein the production database processes query statements from customers to identify the query statement host variable values;
applying test values to a backup database based on the logging data, the test values comprising host variable values of the query statement host variable values, wherein the backup database processes the host variable values in accordance with a plurality of alternative candidate access paths, wherein the backup database iteratively produces return metrics in response to applying test values to the backup database, the return metrics including latency data associated to respective sets of host variable values, the latency data specifying for respective sets of host variable values, a lowest latency access path of the alterative candidate access paths;
examining the returned metrics to iteratively provide instances of a label dataset;
iteratively applying instances of the label dataset to the predictive model as training data for iteratively training the predictive model; and
iteratively updating the predictive model based on the iteratively training the predictive model.

10. The method of claim 1, wherein method includes
receiving from the production database logging data, the logging data including sets of query statement host variable values, wherein the production database processes query statements from customers to identify the query statement host variable values;
applying test values to a backup database based on the logging data, the test values comprising host variable values of the query statement host variable values, wherein the backup database processes the host variable values in accordance with a plurality of alternative candidate access paths, wherein the backup database iteratively produces return metrics in response to applying test values to the backup database, the return metrics including latency data associated to respective sets of host variable values, the latency data specifying for respective sets of host variable values, a lowest latency access path of the alterative candidate access paths, wherein first and second of the alternative candidate access paths are differentiated by having differentiated access methods, wherein third and fourth of the alternative candidate access paths are differentiated by having differentiated join sequence characteristics, wherein fifth and sixth of the alternative candidate access paths are differentiated by having differentiated join method characteristics;
examining the returned metrics to iteratively provide instances of a label dataset;
iteratively applying instances of the label dataset to the predictive model as training data for iteratively training the predictive model, wherein respective instances of the label dataset include (a) a host variable value set, and (b) latency metrics data for each of the alternate candidate access paths associated to the host variable value set; and
wherein the predictive model is iteratively updated based on the iteratively training the predictive model.

11. The method of claim 1, wherein the method includes
receiving by a manager system external to the production database logging data, the logging data including sets of query statement host variable values, wherein the production database processes query statements from customers to identify the query statement host variable values;
applying, by the manager system, test values to a backup database based on the logging data, the backup database being external to the production database and the manager system, the test values comprising host variable values of the query statement host variable values, wherein the backup database processes the host variable values in accordance with a plurality of alternative candidate access paths, wherein the backup database iteratively produces return metrics in response to applying test values to the backup database, the return metrics including latency data associated to respective sets of host variable values, the latency data specifying for respective sets of host variable values, a lowest latency access path of the alterative candidate access paths, wherein first and second of the alternative candidate access paths are differentiated by having differentiated access methods, wherein third and fourth of the alternative candidate access paths are differentiated by having differentiated join sequence characteristics, wherein fifth and sixth of the alternative candidate access paths are differentiated by having differentiated join method characteristics;
examining, by the manager system, the returned metrics to iteratively provide instances of a label dataset;
iteratively applying, by the manager system, instances of the label dataset to the predictive model as training data for iteratively training the predictive model, wherein respective instances of the label dataset include (a) a host variable value set, and (b) latency metrics data for each of the alternate candidate access paths associated to the host variable value set; q
iteratively sending, by the manager system, to the production database retrained versions of the predictive model retrained by the iteratively applying instances of the label dataset, for updating of the predictive model by the production database; and
iteratively copying, by the production database, data of the production database into the backup database.

12. The method of claim 1, the logging data including historical values, iteratively applying test values to a backup database of the production database for processing by the backup database, the test values being based on the logging data, iteratively receiving return latency performance metrics from the backup database in response to the applying test values.

13. The method of claim 1, the logging data including historical values, iteratively applying test values to a backup database within a test environment into which data of the production database is iteratively copied according to a schedule for backup, the test values being based on the logging data, iteratively receiving return metrics from the backup database in response to the applying test values.

14. The method of claim 1, the logging data including historical values data specifying historical query statement values included in query statements received and processed by the production database, iteratively applying test values to a backup database of the production database, the test values being based on the data specifying historical query statement values included in query statements received and processed by the production database, iteratively receiving return metrics from the backup database to the applying test values.

15. The method of claim 1, wherein the method includes receiving from the production database logging data, the logging data including query statement values, wherein the production database processes query statements from customers to identify the query statement values; applying test values to a backup database based on the logging data, the test values comprising values of the query statement values, wherein the backup database processes the test values in accordance with a plurality of alternative candidate access paths, wherein the backup database iteratively produces return metrics in response to applying test values to the backup database, the return metrics including latency data associated to respective sets of test values, the latency data specifying for respective sets of test values, a lowest latency access path of the alterative candidate access paths.

16. The method of claim 1, wherein the method includes: receiving from the production database logging data, the logging data including query statement values, wherein the production database processes query statements from customers to identify the query statement values; applying test values to a backup database based on the query statement values of the logging data, wherein the backup database processes the test values in accordance with a plurality of alternative candidate access paths, wherein the backup database iteratively produces return metrics in response to applying test values to the backup database.

17. A computer program product comprising:
a computer readable storage medium readable by one or more processing circuit and storing instructions for execution by one or more processor for performing a method comprising:
receiving, by a production database, a query statement for processing by the production database;
the production database in performing runtime execution processing of the query statement identifying one or more query statement value of the query statement;
the production database in performing runtime execution processing of the query statement establishing, using a predictive model, an access path based on the identified one or more query statement value; and
the production database using the established access path in performing runtime execution processing of the query statement, wherein the predictive model is a trained predictive model trained by machine learning, wherein training of the predictive model includes iteratively obtaining logging data from the production database, the logging data including historical values, iteratively sending test values to a backup database of the production database, the test values being based the logging data, iteratively receiving return metrics from the backup database, and examining the returned metrics to iteratively provide a label dataset and iteratively applying the label dataset to the predictive model as training data to train the predictive model, wherein the backup database subjects the test values to processing by alternative candidate access paths, and wherein the return metrics include performance metrics associated to the alternative candidate access paths.

18. A system comprising:
a memory;
at least one processor in communication with memory; and
program instructions executable by one or more processor via the memory to perform a method comprising:
receiving, by a production database, a query statement for processing by the production database;
the production database in performing runtime execution processing of the query statement identifying one or more query statement value of the query statement;
the production database in performing runtime execution processing of the query statement establishing, using a predictive model, an access path based on the identified one or more query statement value; and
the production database using the established access path in performing runtime execution processing of the query statement, wherein the predictive model is a trained predictive model trained by machine learning, wherein training of the predictive model includes iteratively obtaining logging data from the production database, the logging data including historical values, iteratively sending test values to a backup database of the production database, the test values being based the logging data, iteratively receiving return metrics from the backup database, and examining the returned metrics to iteratively provide a label dataset and iteratively applying the label dataset to the predictive model as training data to train the predictive model, wherein the backup database subjects the test values to processing by alternative candidate access paths, and wherein the return metrics include performance metrics associated to the alternative candidate access paths.

19. The system of claim 18, wherein the method includes performing by the production database a first time the query statement is received, a bind time process in which candidate access paths are generated, and storing the candidate access paths in a catalog table of the production database.

20. The system of claim 18, wherein the method includes performing by the production database a first time the query statement is received, performing a bind time process in which candidate access paths are generated, and storing the candidate access paths in a catalog table of the production database, and wherein the establishing includes selecting an access path of the candidate access paths.

\* \* \* \* \*